April 6, 1965 A. H. SIMON ETAL 3,177,433
MEANS FOR MODIFYING THE WAVEFORM OF A PULSE AS IT
PASSES THROUGH CONTROLLED DELAY LINE
Filed Aug. 15, 1961 4 Sheets-Sheet 1
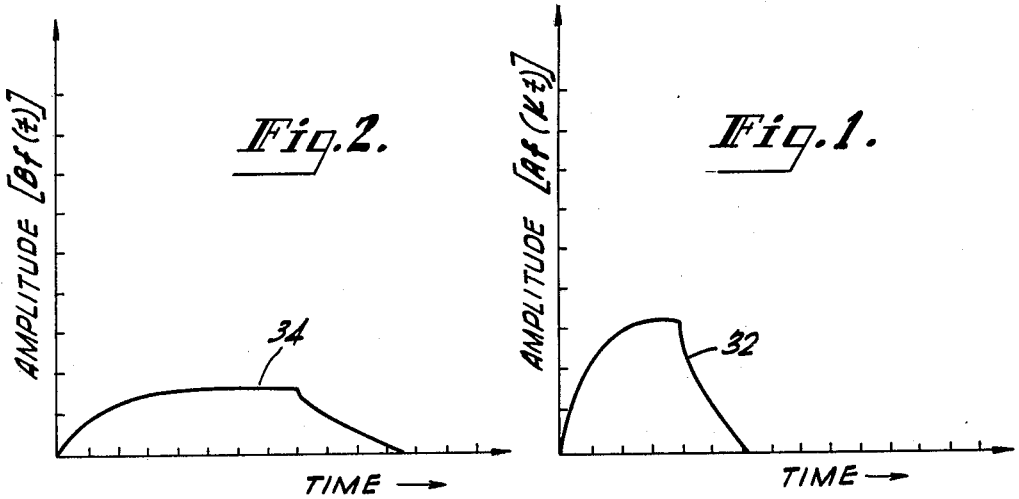
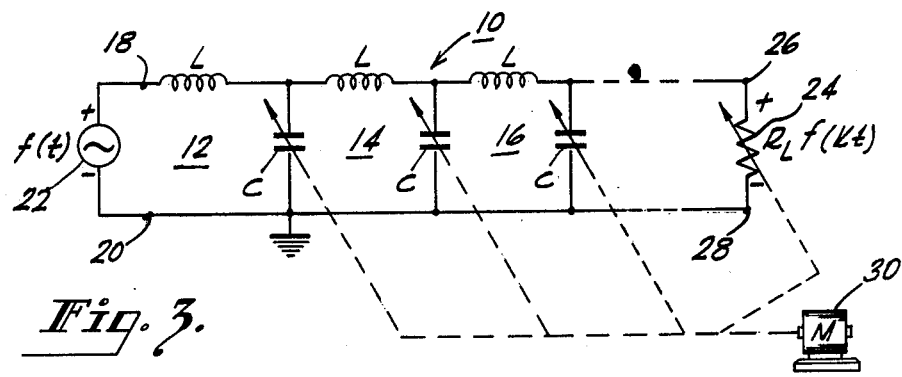
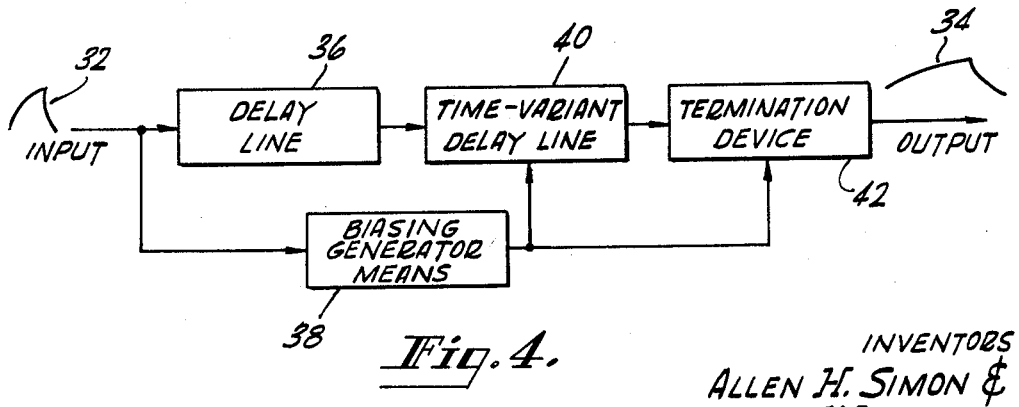
INVENTORS
ALLEN H. SIMON &
HILLEL WEINSTEIN
BY
ATTORNEY

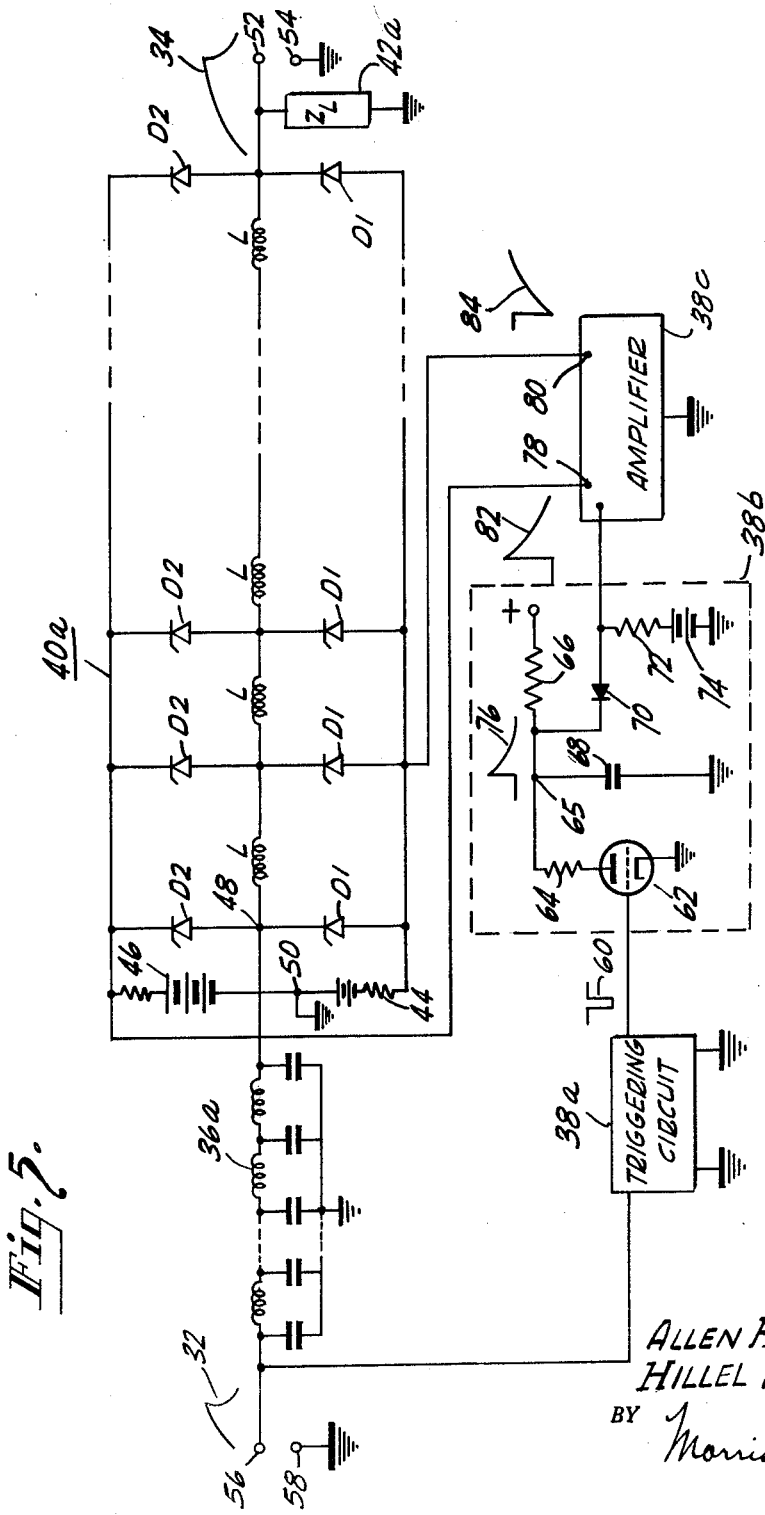

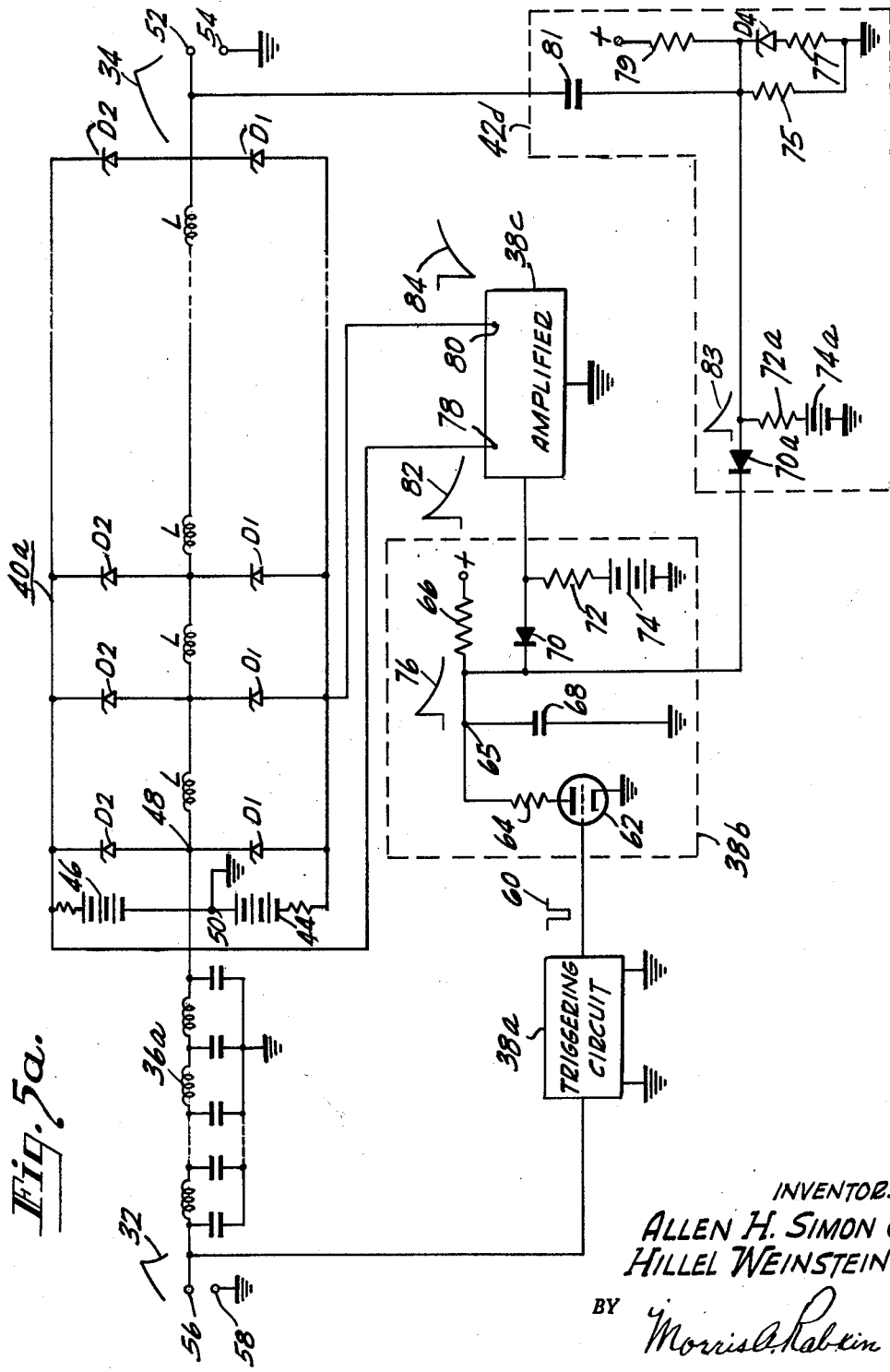

INVENTORS
ALLEN H. SIMON &
HILLEL WEINSTEIN

BY

ATTORNEY

United States Patent Office 3,177,433
Patented Apr. 6, 1965

1

3,177,433
MEANS FOR MODIFYING THE WAVEFORM OF A PULSE AS IT PASSES THROUGH CONTROLLED DELAY LINE
Allen H. Simon, Princeton, N.J., and Hillel Weinstein, New York, N.Y., assignors to Radio Corporation of America, a corporation of Delaware
Filed Aug. 15, 1961, Ser. No. 131,539
19 Claims. (Cl. 328—58)

This invention relates generally to means for modifying the waveform of a pulse, and more particularly to apparatus for modifying the width of a pluse with respect to time. The improved apparatus of the present invention is particularly useful for stretching the waveforms of pulses whose original widths are too narrow to be applied directly to an oscilloscope for visual display.

It is well known that relatively very fast pulses, that is pulses whose widths are of the order of nanosecond ($10^{-9}$ sec.), for example, cannot be applied directly to conventional, relatively inexpensive oscilloscopes for display purposes because of the oscilloscope's bandwith limitations. It has been proposed to display repetitive pulses of relatively high frequencies on an oscilloscope by employing sampling techniques wherein successively progressive samples are taken of successive repetitive pulses, and the samples are reconstructed on the oscilloscope to form pulses of relatively lower frequency. Apparatus employing sampling techniques, however, have two inherent limitations. Firstly, sampling techniques can be applied only to repetitive waveforms, and, secondly, the speed of sampling is limited by the speed of the sampling device itself. Where a single pulse of very narrow width is to be observed on an oscilloscope, prior art sampling techniques cannot be used.

It is an object of the present invention to provide improved means for modifying the waveform of a pulse with respect to time.

Another object of the present invention is to provide improved means for stretching repetitive, as well as non-repetitive, pulses so that they may be viewed on conventional, relatively inexpensive oscilloscopes.

Still another object of the present invention is to provide improved means for compressing the waveforms of repetitive, as well as non-repetitive, pulses with respect to time.

A further object of the present invention is to provide improved means for modifying the waveform of a short-duration pulse continuously and linearly with respect to time.

Still a further object of the present invention is to provide improved apparatus of the type described employing a novel transmission line that has a characteristic that may be varied to change its velocity of propagation.

In accordance with the present invention, the improved means for modifying the waveform of a pulse with respect to time comprises a novel delay line whose propagation velocity can be varied. The pulse whose width is to be stretched, for example, is applied to the input of the delay line, and means are provided to change at least one of the characteristics of the delay line, that is, its capacitance or its inductance, or both, simultaneously over the entire delay line while the pulse is traveling through the delay line. By decreasing the propagation velocity of the delay line, the pulse emerges at the output of the delay line with its waveform stretched with respect to time. In one embodiment of the invention, the delay line comprises a plurality of substantially similar sections each of which has an inductor and at least one diode that is adapted to function as a voltage variable capacitor. Means are provided to apply, at the proper time, a voltage across the delay line to vary its capacitance to decerase the velocity of the pulse to be stretched while it is traveling through the delay line. In another embodiment of the present invention, means are provided to vary the termination impedance of the delay line as a characteristic of the delay line is varied. In still another embodiment of the present invention, the novel delay line comprises conductors separated by a ferroelectric material, and means are provided to change a characteristic of the delay line over the entire length of the delay line simultaneously to change its propagation velocity while a pulse traverses it. In a further embodiment of the present invention, the novel delay line comprises a ferromagnetic material, and means are provided to change the inductance characteristic of the delay line while a pulse is traveling through it.

While the apparatus of the present invention is particularly useful to stretch the width of relatively narrow pulses so that they may be viewed satisfactorily on a conventional oscilloscope, it is within the contemplation of the present invention to employ the novel apparatus to compress the width of a pulse by effecting a change in the polarity, or direction, of the energy that causes a characteristic of the delay line to vary for pulse-stretching purposes.

The novel features of the present invention, both as to its organization and methods of operation, as well as additional objects and advantages thereof, will be readily understood from the following description when read in connection with the accompanying drawings in which similar reference characters refer to similar components throughout, and in which:

FIG. 1 represents the waveform of a pulse whose width is to be stretched with respect to time;

FIG. 2 represents the waveform of the pulse of FIG. 1 after it has been stretched with respect to time in accordance with the present invention;

FIG. 3 is a schematic diagram of an embodiment of the present invention illustrating a time-variant delay line and illustrating the principles by means of which a characteristic of the delay line can be varied simultaneously over the entire length of the delay line to change the velocity of a pulse traveling through it;

FIG. 4 is a block diagram of improved apparatus for modifying the width of a pulse with respect to time in accordance with the present invention;

FIG. 5 is a schematic diagram of an embodiment of the novel apparatus of the present invention employing a time-variant delay line comprising diodes that function as voltage variable capacitors;

FIG. 5a is a schematic diagram of novel apparatus similar to that of FIG. 5, showing, in addition, means to vary the termination impedance of the time-variant delay line simultaneously with variations of a characteristic of the delay line;

Figure 6:
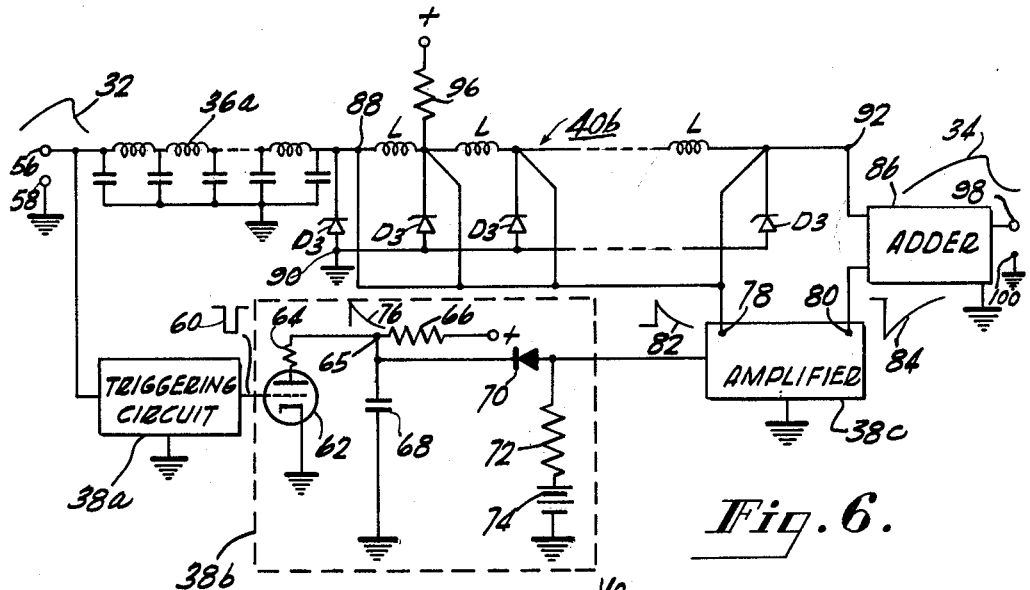
FIG. 6 is a schematic diagram of another embodiment of the improved apparatus of the present invention employing a time-variant delay line comprising diodes that function as voltage variable capacitors.

Referring, now, to FIG. 3 of the drawings, there is shown a time-variant delay line 10 whose capacitance characteristic can be varied simultaneously over the entire delay line. The delay line 10 comprises a plurality of substantially similar sections 12, 14, 16, etc., each of which, in turn, comprises an inductor L and a variable capacitor C. The delay line 10 has a pair of input terminals 18 and 20 for applying an input pulse thereto, as from a signal generator 22. An impedance, such as a variable resistor 24, is connected between the output terminals 26 and 28 of the delay line 10 to terminate the delay line 10 with its characteristic impedance.

The shaft of each variable capacitor C is connected to the shaft of a motor 30 so that the capacity of each capacitor C can be varied simultaneously while a pulse is traveling through the delay line 10. The shaft of the variable resistor 24 is also connected to the shaft of the motor 30.

Let it be assumed, for example, that it is desired to stretch the width of a pulse 32, shown in FIG. 1. The pulse 32 is applied to the input terminals 18 and 20 of delay line 10, and the capacitance characteristic of the delay line 10 is varied over its entire length by varying simultaneously the capacity of each capacitor C in each section 12, 14, 16, etc. of the delay line 10. Since the propagation velocity of the delay line 10 varies inversely with its capacitance characteristic, the pulse derived at the output terminals 26 and 28 is stretched if the motor 30 increases the capacitance of each capacitor C while the pulse 32 is traveling through the delay line 10. Thus, the pulse emerging at the output of delay line 10 may have the stretched waveform 34, shown in FIG. 2, depending upon the actual values of the components used. It will be noted that if the motor 30 were rotated in a direction so as to decrease the capacitance of the capacitors C, the input pulse 32 would emerge from the delay line 10 as a compressed pulse whose width would be shorter than the input pulse 32. By varying the resistor 24 simultaneously with the capacitors C, the delay line 10 may always be terminated with its characteristic impedance, even though one of its characteristics is being varied.

Referring, now, to FIG. 4, there is shown, in block diagram form, an arrangement of apparatus for stretching (or compressing) an input pulse with respect to time. The input pulse 32 is applied to the input of a delay line 36 and to the input of biasing generator means 38. The delay line 36 delays the entrance of the pulse into a time-variant delay line 40 until an output pulse from the biasing generator means 38 can be applied to the time-variant delay line 40. The biasing generator means 38 comprises means to provide an output voltage of desired waveform in response to the input pulse 32, and functions to change the capacity characteristic of the delay line 40 in a manner to be hereinafter described. This change causes a change in the propagation velocity of the delay line 40. The velocity of the pulse traveling through the delay line 40 is altered, and the pulse emerges across a termination device 42. The termination device 42 may comprise a variable or a fixed impedance, for example, depending upon whether or not it is desired to vary the characteristic impedance of the delay line 40, as will be hereinafter explained.

Referring, now, to FIG. 5, there is shown apparatus for stretching (or compressing) the width of a pulse by means of apparatus employing a delay line 40a whose capacitance characteristic may be varied simultaneously over the entire length of the delay line while a pulse whose width is to be altered passes through it. The delay line 40a comprises a common conductor, indicated as ground, a plurality of similar inductors L connected to each other in series, and two sets of diodes D1 and D2, respectively. The cathodes of the respective diodes D1 are connected to one end of each end of the inductors L, respectively. The anodes of the diodes D2 are also connected to one end of each of the inductors L, respectively. The anodes of diodes D1 are connected to each other and to the common conductor through a source 44 of unidirectional biasing voltage. The cathodes of the diodes D2 are connected to each other and to the common conductor through a source 46 of unidirectional biasing voltage. The voltage sources 44 and 46 are equal to each other in voltage.

The diodes D1 and D2 comprise semiconductor components that exhibit a characteristic of capacitance that is proportional to the voltage applied across them. Such diodes are commercially available under the trade name of "Varactor." Diodes D1 and D2 are also known as variable-capacitance diodes, such as the type described in "Transistors I," published by RCA Laboratories, Princeton, N.J., March 1956.

The voltage sources 44 and 46 back bias the diodes D1 and D2, respectively, so that they provide a desired capacitance of a predetermined value. This predetermined value may be considered the quiescent value of capacitance of the diodes, and at this value provides a corresponding shunt, quiescent capacity per unit length of the delay line, or the equivalent. The capacitance of the delay line 40a can be varied from this quiescent value by the application of an additional voltage, as will be hereinafter explained.

One end of the serially connected inductors L of the delay line 40a comprises one input terminal 48, and the common conductor comprises the other input terminal 50. The other end of the serially connected inductors L comprises one output terminal 52. Another output terminal 54 is connected to the common conductor. An impedance 42a is connected across the output terminals 52 and 54 to terminate the delay line 40 with its characteristic impedance. The impedance 42a may be fixed at an average value of impedance if the characteristic impedance of the delay line does not vary objectionably when one of the characteristics of the delay line is varied.

The input pulse 32 to be stretched is applied across a pair of input terminals 56 and 58 of a delay line 36a. The output of the delay line 36a is connected to the input terminals 48 and 50 of the time-variant delay line 40a. In order to change the velocity of the pulse traveling through the delay line 40a, means are provided to change the capacity across the diodes D1 and D2 while the pulse 32 is traveling through the delay line 40a. This can be done by changing the voltage across the diodes D1 and D2. To this end, biasing generator means, comprising a triggering circuit 38a, a biasing generator 38b, and an amplifier 38c are provided. The input pulse 32 is applied to the input of the triggering circuit 38a to provide a sharp, negative-going pulse 60 at its output. The triggering circuit 38a comprises means to provide a sharp, negative-going output pulse regardless of the polarity of the pulse applied to its input. Triggering circuits 38a of this type are well known in the art and, therefore, will not be described in detail.

The negative-going pulse 60 is applied to the grid of a normally conducting triode 62 in the biasing generator 38b. The cathode of the triode 62 is connected to a common connection such as ground, and the anode is connected to a source of positive voltage through serially connected resistors 64 and 66. The common junction 65 of the resistors 64 and 66 is connected to ground through a capacitor 68 and to the input of an amplifier 38c through a diode 70. The anode of the diode 70 is connected to ground through a resistor 72 in series with a source 74 of unidirectional clamping voltage.

The biasing generator 38b functions as follows: The negative-going pulse 60 from the output of the triggering circuit 38a cuts off conduction through the normally conducting triode 62 and causes the voltage at the junction 65 to rise sharply. When the pulse 60 is removed, the previously charged capacitor 68 discharges through the triode 62 in accordance with the time constant of the capacitor 68 and the resistor 64. The voltage produced at the junction 65 has a waveform like the waveform 76. When the capacitor 68 has discharged a predetermined amount, current begins to flow through the diode 70, and a voltage is applied to the amplifier 38c. Voltages of opposite-going polarity with respect to ground then appear at the output terminals 78 and 80 of the amplifier 38c. Voltages of opposite-going polarity, as, for example, voltages illustrated by the waveforms 82 and 84, are applied across the diodes D2 and D1, respectively. The amplitudes and waveforms of the voltages applied across the diodes D1 and D2 are determined by the voltage-capacitance characteristics of the diodes D1 and D2. By choosing an appropriate voltage for the clamping voltage source 74, a very good approximation of a desired voltage waveform (a portion of the decaying voltage from the capacitor 68) may be had for commercially available, variable capacitance diodes D1 and D2.

The operation of the apparatus shown in FIG. 5 for stretching a pulse 32 with respect to time and for providing an output having the waveform 34 will now be described: The relatively narrow pulse 32 is applied to the input terminals 56 and 58. The input pulse 32 is delayed in the delay line 36a until the triggering circuit 38a is triggered by the input pulse 32. The output from the triggering circuit 38, that is, the negative-going pulse 60, cuts off conduction in the tube 62 and causes the voltage 76 in the biasing generator 38b. A desired portion of the voltage 76 is amplified in the amplifier 38c to provide output voltages, equal in amplitude but opposite in polarity, such as voltages of waveforms 82 and 84. As the pulse 32 leaves the delay line 36a, the biasing voltages 82 and 84 are impressed across the diodes D2 and D1, respectively, to increase the capacity across these diodes, thereby to decrease the velocity of the pulse 32 through the delay line 40a. Since the voltages 82 and 84 are of equal amplitude and of opposite-going polarity, they cancel each other at the output terminals 52 and 54. The voltage pulse 32, however, has had its velocity decreased in the delay line 40a, and it emerges at the output terminals 52 and 54 in a stretched form, as shown by the waveform 34.

It was assumed, in the apparatus shown and described in FIG. 5, that the termination impedance 42a was a satisfactory termination for the delay line 40a while its capacitance characteristic was being varied. If the termination impedance 42a has an impedance value that terminates the delay line with the average characteristic impedance of the delay line 40a while one of its characteristics is varied over a predetermined range of values, the impedance 42a may be fixed and the apparatus may function satisfactorily for many applications. Where, however, the amount of stretching (or compressing) desired is relatively great, and one of the characteristics of the delay line is varied relatively greatly, it may be desirable to vary the termination impedance of the delay line proportionately so that it will always terminate the delay line with its characteristic impedance. An arrangement for accomplishing this result is shown in FIG. 5a.

Variable termination impedance means 42d (FIG. 5a) may comprise a diode D4 of the "Varactor" type and associated components. The cathode of the diode D4 is coupled to the output terminal 52 through an isolating capacitor 81. The anode of the diode D4 is connected to ground through a resistor 77. A source of unidirectional voltage, as indicated, is connected to the diode D4, through a resistor 79, in a direction to back bias it and to provide thereacross a capacitance of quiescent value. The cathode of the diode D4 is connected to ground through a resistor 75.

Means are provided to vary the capacitance of the diode D4 simultaneously while the capacitance of the diodes D1 and D2 is varied whereby to terminate the delay line 40a continuously with its characteristic impedance while this impedance is being varied. To this end, the cathode of the diode D4 is connected to the anode of a diode 70a, and the cathode of the diode 70a is connected to the cathode of the diode 70. The anode of the diode 70a is connected to ground through a resistor 72a in series with a source of voltage 74a. With this arrangement, a voltage having a waveform 83 will appear at the anode of the diode 70a when the voltage of the waveform 76 is applied to the amplifier 38c. The diode 70a is clamped by the voltage source 74a so that the waveform 83 is substantially proportional to the reciprocal of time.

In operation, the velocity of propagation of the delay line 40a is changed by applying voltages 82 and 84 across the diodes D1 and D2, thereby changing their capacitance and, in turn, changing the characteristic impedance of the delay line, as explained supra. The voltage waveform 83 applied across the diode D4 produces a change in its capacitance in a direction whereby changes in the characteristic impedance of the delay line 40a are compensated by changes in the impedance of the diode D4. Thus, the resistors 75 and 77, in conjunction with the diode D4, function to terminate the delay line 40a with its characteristic impedance at all times.

Referring now, to FIG. 6, there is shown an arrangement of apparatus substantially similar to that shown in FIG. 5 except for the time-variant delay line 40b and an adder 86 of conventional design. The delay line 40b is a time-variant delay line having a pair of input terminals 88 and 90, and a pair of output terminals 92 and the common conductor, ground. The delay line 40b comprises a plurality of similar, serially connected inductors L connected between the input terminal 88 and the output terminal 92, and a plurality of variable-capacitance diodes D3 connected between the common conductor, ground, and the ends of the inductors L, respectively. A source of unidirectional voltage (not shown) is connected across the diodes D3 through a resistor 96 to back bias the diodes D3 and to provide a predetermined quiescent capacitance across them. The output terminal 78 of the amplifier 38c is connected to each of the cathodes of the diodes D3. The output terminal 80 of the amplifier 38c is connected to one input terminal of the adder 86, and the output terminal 92 of the delay line 40b is connected to another input terminal of the adder 86. Since the input voltages applied to the adder 86, coming from the amplifier 38c, are equal in amplitude and opposite-going in polarity, the adder 86 functions to "cancel" these voltages. Hence, any pulse traveling through the delay line 40b emerges at the output of the adder 86, between output terminals 98 and 100, free from the voltages of the push-pull amplifier 38c. The output terminal 100 is connected to the common conductor, ground.

The operation of the pulse-width modifying apparatus shown in FIG. 6 will now be explained: The pulse 32, applied between the input terminals 56 and 58, triggers the triggering circuit 38a which, in turn, provides at its output the negative-going pulse 60. The pulse 32 is applied to the input terminals of the delay line 40b after a fixed delay provided by the delay line 36a. A decreasing voltage is applied across each of diodes D3 in each of the similar sections of the delay line 40b, and an equal voltage of opposite-going polarity is applied to one of the input terminals of the adder 86. The voltage of waveform 82 that is applied across the diodes D3 increases the capacitance across these diodes and thereby decreases the velocity of the pulse 32 traveling through the delay line 40b. Since the adder 86 is connected to cancel the voltage 82 with the voltage 84, the voltage emerging between the output terminals 98 and 100 is the stretched pulse 34. The stretched voltage pulse 34 is actually the voltage pulse 32 that has been stretched linearly with respect to time due to the decrease in its velocity through the time-variant delay line 40b. It is noted that if the voltage across the diodes D3 were to decrease, the output pulse 34 would be a compressed version of the input pulse 32.

Figure 7:
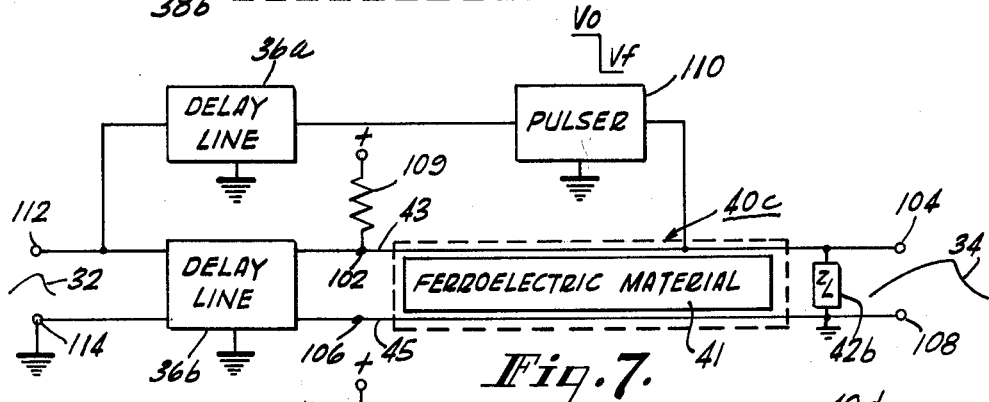
FIG. 7 is a schematic block diagram of still another embodiment of the present invention employing a time-variant delay line that comprises a ferroelectric material.

In FIG. 7, there is shown an arrangement of apparatus for stretching (or compressing) the width of the pulse of waveform 32. The apparatus employs a time-variant delay line 40c that has a ferroelectric material 41 disposed between two conductors 43 and 45. The conductor 43 is connected between an input terminal 102 and an output terminal 104, and the conductor 45 is connected between an input terminal 106 and an output terminal 108. The ferroelectric material 41 may comprise triglycine sulphate, barium titanate, and the like. An output impedance 42b is connected between the output terminals 104 and 108, the latter of which is grounded, to terminate the delay line 40c with its average characteristic impedance during operation. A source of voltage, as indicated, is applied between the conductors 43 and 45 through a resistor 109 to bias the delay line 40c at a quiescent point of operation.

The output of a pulse circuit 110 is connected to the conductors 43 and 45 of the delay line 40c to apply to the latter a (final) voltage $V_f$ in response to a pulse applied to its input. In the absence of a pulse applied to the pulser circuit 110, the (original) output voltage of the pulser is $V_o$, a higher voltage than $V_f$.

In operation, an input pulse, such as the pulse 32, applied to input terminals 112 and 114 of the apparatus of FIG. 7, is delayed a fixed amount by the delay line 36a and a fixed amount by the delay line 36b. The output pulse from the delay line 36a triggers the pulser circuit 110 so that the latter switches the voltage across the conductors 43 and 45 of the delay line 40c from $V_o$ to $V_f$. The pulse 32 emerging from the delay line 36b enters the delay line 40c just before the voltage across the latter decreases from $V_o$ to $V_f$. A change in the voltage across the ferroelectric material 41 causes a change in the capacitance characteristic of the delay line 40c so that the pulse traveling through it is slowed up. The slowed-up pulse emerging between the output terminals 104 and 108 of the delay line 40c has a waveform that is stretched linearly with respect to time, such as the waveform 34. Conversely, an increase in the voltage across the conductors 43 and 45, from $V_o$ to a higher voltage, while a pulse is traveling through the delay line 40c causes a compression of the pulse because its velocity is increased.

Figure 8:
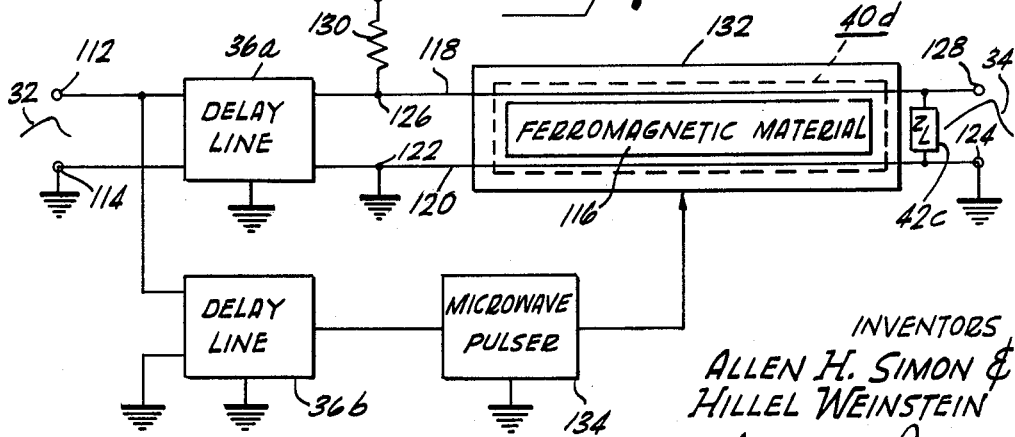
FIG. 8 is a schematic block diagram of another embodiment of the improved apparatus of the present invention employing a time-variant delay line comprising a ferromagnetic material.

A further embodiment of apparatus for altering the width of a pulse with respect to time, in accordance with the present invention, is shown in FIG. 8. A time-variant delay line 40d comprises a ferromagnetic material 116, such as ferrite material and the like, disposed between conductors 118 and 120. The conductor 120 is connected between a grounded input terminal 122 and a grounded output terminal 124. The conductor 118 is connected between an input terminal 126 and an output terminal 128. A source of unidirectional voltage, as indicated, is connected between the conductors 118 and 120 through a resistor 130 to fix the inductance characteristic of the delay line 40d at a desired, quiescent value.

Means are provided to change the inductance characteristic of the time-variant delay line 40d to alter its velocity of propagation. To this end, the delay line 40d is disposed within a waveguide 132, and the output of a microwave pulser 134 is connected to the waveguide 132 to produce a magnetic field therein, when pulsed. The microwave pulser 134 comprises means to provide a strong microwave pulse when triggered by an input pulse. An impedance 42c is connected between the output terminals 128 and 124 of the delay line 40d to terminate it with its average characteristic impedance during operation.

In operation, the pulse 32 whose width is to be altered is applied between the input terminals 112 and 114 of the delay line 36a. The pulse 32 is applied to the input terminals 126 and 122 of the delay line 40d after a fixed delay determined by the delay line 36a. The pulse 32 is also applied to the input of the microwave pulser 134 after a fixed delay determined by the delay line 36b, and a sharp microwave pulse is applied to the waveguide 132. The delays determined by the delay lines 36a and 36b are such as to cause the waveguide 132 to be pulsed just after the pulse 32 enters the delay line 40d. Pulsing the waveguide 132 produces a strong magnetic field therein which is at right angles to both the magnetic and electric fields produced by the pulse 32 in its travel through the delay line 40d. By producing a magnetic field within the waveguide 132, the inductance of the ferromagnetic material 116 is altered, thereby also altering the velocity of propagation of the delay line 40d. The output pulse 34 that emerges between the output terminals 128 and 124 of the delay line 40d is stretched or compressed with respect to time, depending upon the direction of the magnetic field within the waveguide 132, that is, depending upon whether it adds to or substracts from the magnetic field produced by the fixed bias across the ferromagnetic material 116.

From the foregoing description, it will be apparent that there has been provided improved means for modifying the waveform of a pulse. While the improved pulse-modifying means has been described and illustrated in connection with the stretching and compressing of a single pulse, it is within the contemplation of the present invention to alter repetitive waveforms with respect to time as well. Also, while the embodiments of the present invention have been shown in diagrammatic form, various components useful therein, as well as variations in the apparatus itself, coming within the spirit of this invention will, no doubt, readily suggest themselves to those skilled in the art. Hence, it is desired that the foregoing shall be considered as illustrative and not in a limiting sense.

What is claimed is:

1. Apparatus comprising a delay line having an input and an output, said delay line having characteristics of inductance and capacitance, means to apply a pulse of a predetermined width to said input, means coupling said pulse to said delay line to vary one of said characteristics while said pulse is traveling through said delay line, and means to derive said pulse with said width altered with respect to time at said output.

2. Apparatus comprising a delay line having an input and an output, said delay line having characteristics of inductance and capacitance, means to apply a pulse of a predetermined width to said input, termination impedance means, means connecting said termination impedance means to said output, means coupling said pulse to said delay line to vary one of said characteristics while said pulse is traveling through said delay line, and means coupled to said termination impedance means to vary its impedance to terminate said delay line with its characteristic impedance as said one characteristic is varied.

3. Apparatus for stretching a pulse comprising a delay line having an input and an output, said delay line having characteristics of inductance and capacitance, means to apply a pulse of a predetermined width to said input, means coupling said pulse to said delay line to vary one of said characteristics while said pulse is traveling through said delay line, and means to derive said pulse with said width stretched with respect to time at said output.

4. Apparatus comprising a delay line having an input and an output, said delay line having a plurality of substantially similar sections each having characteristics of inductance and capacitance, means to apply a pulse of a predetermined width to said input, means coupling said pulse to said sections to vary one of said characteristics in each of said sections simultaneously while said pulse is traveling through said delay line, and means connected to said output to derive said pulse with a width different from said predetermined width.

5. Apparatus comprising a delay line having an input and an output, said delay line having a plurality of substantially similar sections each having characteristics of impedance and capacitance, means to apply a pulse having a predetermined width to said input, means coupling said pulse to said sections to vary one of said characteristics in each of said sections simultaneouly while said pulse is traveling through said delay line, termination impedance means, means connecting said termination impedance means to said output, and means to vary the impedance of said termination impedance means simultaneously with the variation of said one characteristic.

6. Apparatus for modifying the waveform of a pulse with respect to time, said apparatus comprising a delay line having an input and an output, said delay line having a plurality of substantially similar sections each comprising a component having a capacitance that varies with voltage, means to apply a voltage to said components to fix their capacities at a predetermined value, means to apply said pulse to said input, means coupling said pulse to each of said sections to vary said capacitances simultaneously from said predetermined value in each of said sections while said pulse is traveling through said delay line, and means to derive said pulse in a modified waveform with respect to time at said output.

7. Apparatus for modifying the width of a pulse with respect to time, said apparatus comprising a delay line having an input and an output, said delay line having a plurality of substantially similar sections each having characteristics of inductance and capacitance, means to apply a voltage to said delay line to fix one of said characteristics at a predetermined value, means to apply said pulse of a predetermined width to said input, means coupling said pulse to said sections to vary said one characteristic simultaneously from said predetermined value in each of said sections while said pulse is traveling through said delay line, termination impedance means, means connecting said termination impedance means to said output, means to vary the impedance of said termination impedance means simultaneously with the variation of said one characteristic, and means to derive said pulse at said output with said width altered with respect to time.

8. Apparatus for modifying the width of a pulse with respect to time, said apparatus comprising a delay line having an input and an output and a plurality of substantially similar sections, each of said sections comprising an inductor and a diode, each of said diodes having a capacity that varies with the voltage impressed across it, means to apply a voltage across said diodes in each of said sections to obtain a predetermined value of capacitance in each of said sections, means to apply said pulse of a predetermined width to said input, means coupled to each of said sections to apply a varying voltage across said diodes simultaneously, whereby to vary the capacitance of each of said sections simultaneously while said pulse is traveling through said delay line, and means to derive said pulse at said output with a width different from said predetermined width with respect to time.

9. Apparatus for modifying the waveform of a pulse with respect to time, said apparatus comprising a delay line having an input and an output, said delay line having a plurality of substantially similar sections, each of said sections comprising an inductor and a diode, said diode having a capacity that varies with the voltage impressed across it, means to apply a voltage across said diodes in each of said sections to obtain a predetermined value of capacitance in each of said sections, means to apply said pulse of predetermined width to said input, means connected to each of said sections to apply a voltage across said diodes simultaneously whereby to change the capacitance of each of said sections simultaneously while said pulse is traveling through said delay line, termination impedance means, means connecting said termination impedance means to said output, and means to apply a voltage to said termination impedance means to change the impedance of said termination impedance means in proportion to changes of the capacities of said diodes.

10. Means for changing the width of a pulse with respect to time, said changing means comprising a first delay line having an input and an output, biasing generator means having an input and an output, said biasing generator means comprising means to provide a varying output voltage when said pulse is applied to its input, means to apply said pulse of a predetermined width to said input of said first delay line and to said input of said biasing generator means, a second delay line having an input and an output, means connecting said output of said first delay line to said input of said second delay line, means connecting said output of said biasing generator means to said second delay line to vary one of its characteristics simultaneously over its entire length to change the velocity of propagation of said second delay line while said pulse is passing through it, and means to derive said pulse at said output of said second delay line with a width different from said predetermined width with respect to time.

11. Means for changing the width of a pulse with respect to time, said changing means comprising a first delay line having an input and an output, biasing generator means having an input and an output, said biasing generator means comprising means to provide a varying output voltage when said pulse is applied to its input, means to apply said pulse of a predetermined width to said input of said first delay line and to said input of said biasing generator means, a second delay line having an input and an output, means connecting said output of said first delay line to said input of said second delay line, means connecting said output of said biasing generator means to said second delay line to vary one of its characteristics simultaneously over its entire length while said pulse is passing through it, termination impedance means, means connecting said output of said second delay line to said termination impedance means, and means connected to said termination impedance means to change its impedance when said one characteristic of said second delay line is varied, whereby to terminate said second delay line with its characteristic impedance while said pulse is passing through it.

12. Apparatus comprising a delay line having an input and an output, said delay line having characteristics of inductance and capacitance, means to apply a pulse of a predetermined width to said input, means coupling said pulse to said delay line to vary one of said characteristics simultaneously over said entire delay line while said pulse is traveling through said delay line whereby to vary the characteristic impedance of said delay line over a predetermined range of impedances, means connected to said output to terminate said delay line with termination impedance means having a value of impedance that is substantially an average of said range of impedances, and means to derive said pulse with said width altered with respect to time at said output.

13. Means for changing the waveform of a pulse with respect to time comprising a delay line having characteristics of inductance and capacitance, said delay line having an input and an output and comprising a plurality of similar inductors connected in series with each other, a common conductor, and a plurality of substantially similar diodes each connected between an end of an inductor, respectively, and said common conductor, each of said diodes exhibiting a capacity that varies with the amplitude of voltage applied across it, means to apply a fixed voltage bias across said diodes to provide a predetermined capacity for said delay line, biasing generator means having an input and an output, said biasing generator means comprising means to provide at its output a varying voltage when said pulse is applied to said input, means to apply said pulse to said input of said biasing generator means and to said input of said delay line to apply said varying voltage thereacross, means connected to said output of said biasing generator means and to said output of said delay line to cancel said varying voltage, and means connected to said last-mentioned means to derive said pulse in a waveform different from said predetermined waveform with respect to time.

14. Means for changing the waveform of a pulse with respect to time comprising a delay line having characteristics of inductance and capacitance, said delay line having an input and an output and comprising a plurality of similar inductors connected in series with each other, a common conductor, and a plurality of substantially similar diodes each connected between an end of an inductor, respectively, and said common conductor, each of said diodes exhibiting a capacity that varies with the amplitude of voltage applied across it, biasing generator means having an input and an output, said biasing generator means comprising means to provide at its output a varying push-pull voltage when said pulse is applied to said input, means to apply said pulse to said input of said biasing generator means and to said input of said delay line to apply said varying voltage thereacross, an adder, means connecting said adder to said output of said biasing generator means and to said output of said delay line to cancel said push-pull voltage, and means connected to said adder to derive said pulse in a waveform different from said predetermined waveform with respect to time.

15. Apparatus for altering the width of a pulse with respect to time, said apparatus comprising a delay line having a plurality of substantially similar sections, each of said sections comprising a common conductor, an inductor, and a pair of diodes connected in series with each other, one end of said inductor being connected to the common junction of said pair of diodes in each of said sections, respectively, each of said diodes having a capacity that varies with the amplitude of a voltage applied across it to back bias it, said inductors of said sections being connected in series with each other, an anode of one diode in each of said pair of diodes being connected to each other, a cathode of the other diode of each of said pair of diodes being connected to each other, means to apply a push-pull voltage with respect to said common conductor between said anodes and said cathodes, means to apply said pulse between one end of said serially connected inductors and said common conductor while said push-pull voltage is applied across said diodes, and means to derive said pulse with its original width altered with respect to time between the other end of said serially connected inductors and said common conductor.

16. Apparatus for altering the width of a pulse with respect to time, said apparatus comprising a delay line having a plurality of substantially similar sections, each of said sections comprising a common conductor, an inductor, and a pair of diodes connected in series with each other, one end of said inductor being connected to the common junction of said pair of diodes in each of said sections, respectively, each of said diodes having a capacity that varies with the amplitude of a voltage applied across it to back bias it, said inductors of said sections being connected in series with each other, an anode of one diode in each of said pair of diodes being connected to each other, a cathode of the other diode of each of said pair of diodes in each of said sections being connected to each other, means to apply a push-pull voltage with respect to said common conductor between said anodes and said cathodes, means to apply said pulse between one end of said serially connected inductors and said common conductor while said push-pull voltage is applied across said diodes, means to derive said pulse with its original width altered with respect to time between the other end of said serially connected inductors and said common conductor, termination impedance means including a diode having a voltage variable capacitance, means to connect said termination impedance means between said other end of said serially connected inductors and said common conductor, and means to apply a voltage across said termination impedance means to vary the termination impedance of said delay line when the capacity of said diodes is varied.

17. Apparatus for altering the width of a pulse linearly with respect to time comprising a delay line having a plurality of substantially similar sections, each of said sections comprising an inductor, a diode having a voltage variable capacitance, and a common conductor, said inductors of each of said sections being connected to each other in series, each of said diodes being connected between said common conductor and an end of said inductor in each section, respectively, means to apply said pulse between one end of said serially connected inductors and said common conductor, means to provide a push-pull voltage with respect to ground, means to apply one-half of said push-pull voltage across said diodes when said pulse is traveling through said delay line, an adder having an input and an output, means to connect the other end of said serially connected inductors to said adder, means to apply the other half of said push-pull voltage to said adder, and means to derive said pulse linearly altered with respect to time at said output of said adder.

18. Apparatus comprising a time-variant delay line having an input and an output, said delay line comprising a pair of conductors separated by a ferroelectric material, means to apply a pulse to said input, means to apply a voltage across said ferroelectric material to change its characteristic of capacitance while said pulse is traveling through said delay line, whereby to change the velocity of propagation of said delay line, and means to derive said pulse at said output with a velocity different from its velocity at said input.

19. Apparatus comprising a time-variant delay line having an input and an output, said delay line comprising a pair of conductors separated by a ferromagnetic material, at least a portion of said delay line being disposed in a waveguide, means to apply a first pulse to said input, means to apply a second pulse to said waveguide while said first pulse is traveling through said delay line to change the inductance characteristic of said ferromagnetic material, whereby to change the velocity of propagation of said delay line, and means to derive said first pulse at said output with a velocity that is different from its velocity at said input.

References Cited by the Examiner
UNITED STATES PATENTS

| | | | |
|---|---|---|---|
| 2,382,413 | 8/45 | Hanert | 84—1 |
| 2,852,750 | 9/58 | Goldberg | 333—18 |
| 2,916,709 | 12/59 | Putzrath | 333—29 |
| 3,046,500 | 7/62 | Dewitz | 333—29 |

ARTHUR GAUSS, *Primary Examiner.*

JOHN W. HUCKERT, *Examiner.*